(12) United States Patent
Chen

(10) Patent No.: US 7,581,795 B1
(45) Date of Patent: Sep. 1, 2009

(54) BICYCLE FRAME WHOSE BEARINGS WILL NOT BE PRESSED

(75) Inventor: Ching-Shu Chen, Changhua (TW)

(73) Assignee: Chosen Co., Ltd., Changhua Hsien (TW)

( * ) Notice: Subject to any disclaimer, the term of this patent is extended or adjusted under 35 U.S.C. 154(b) by 153 days.

(21) Appl. No.: 11/749,217

(22) Filed: May 16, 2007

(51) Int. Cl.
*B60B 27/00* (2006.01)

(52) U.S. Cl. .................................................. 301/110.5

(58) Field of Classification Search ............. 301/110.5, 301/124.2, 111.07, 114, 115, 125; 280/279, 280/280, 288
See application file for complete search history.

(56) References Cited

U.S. PATENT DOCUMENTS

| 3,790,304 | A | * | 2/1974 | Langlois | 416/207 |
| 4,613,240 | A | * | 9/1986 | Hagelthorn | 384/585 |
| 7,213,999 | B2 | * | 5/2007 | Haas | 403/337 |
| 2002/0145331 | A1 | * | 10/2002 | Wu et al. | 301/110.5 |

* cited by examiner

*Primary Examiner*—S. Joseph Morano
*Assistant Examiner*—Kip T Kotter
(74) *Attorney, Agent, or Firm*—Alan Kamrath; Kamrath & Associates PA

(57) ABSTRACT

A bicycle frame includes a mandrel, a hub and freewheel assembly, two bearings, two first locking nuts, two fork end members, and two second locking nuts. Thus, when each of the first locking nuts is screwed onto the respective first threaded section of the mandrel and when each of the second locking nuts is screwed onto the respective second threaded section of the mandrel and rested on the respective fork end member, the respective fork end member will not be driven by the respective second locking nut to push the respective first locking nut to prevent the respective bearing from being compressed by the respective first locking nut so as to maintain the normal operation of the respective bearing.

18 Claims, 10 Drawing Sheets

BICYCLE FRAME WHOSE BEARINGS WILL NOT BE PRESSED

BACKGROUND OF THE INVENTION

1. Field of the Invention

The present invention relates to a bicycle frame and, more particularly, to a front or rear bicycle frame.

2. Description of the Related Art

A conventional bicycle frame in accordance with the prior art shown in FIGS. 8-10 comprises a mandrel 11 having two opposite ends each formed with a threaded section 111, a hub and freewheel assembly 12 rotatably mounted on the mandrel 11 and having two opposite ends each formed with a bearing hole 121 to receive at least one bearing 13, two inner locking nuts 14 each screwed onto the respective threaded section 111 of the mandrel 11 and each rested on the respective bearing 13, two fork end members 10 each having a distal end mounted on the mandrel 11 and each rested on the respective inner locking nut 14, and two outer locking nuts 15 each screwed onto the respective threaded section 111 of the mandrel 11 and each rested on the respective fork end member 10.

However, when each of the outer locking nuts 15 is screwed onto the respective threaded section 111 of the mandrel 11 and rested on the respective fork end member 10, the respective fork end member 10 is driven by each of the outer locking nuts 15 to push the respective inner locking nut 14 to compress the respective bearing 13 to interfere with rotation of the respective bearing 13 so that the respective bearing 13 is not rotatable smoothly between the hub and freewheel assembly 12 and the mandrel 11, thereby affecting rotation of the hub and freewheel assembly 12. In addition, when each of the outer locking nuts 15 is screwed onto the respective threaded section 111 of the mandrel 11 after each of the inner locking nuts 14 each screwed onto the respective threaded section 111 of the mandrel 11, the mandrel 11 is rotated by rotation of each of the outer locking nuts 15 so that the mandrel 11 and the hub and freewheel assembly 12 are deviated or deflected.

BRIEF SUMMARY OF THE INVENTION

In accordance with the present invention, there is provided a bicycle frame, comprising a mandrel having two opposite ends each having an inner side formed with a first threaded section and an outer side formed with a second threaded section having a threading direction different from that of the first threaded section, a hub and freewheel assembly rotatably mounted on the mandrel and having two opposite ends each formed with a bearing hole to receive at least one bearing, two first locking nuts each screwed onto the respective first threaded section of the mandrel and each rested on the respective bearing, two fork end members each having a distal end mounted on the mandrel and each rested on the respective first locking nut, and two second locking nuts each screwed onto the respective second threaded section of the mandrel and each rested on the respective fork end member.

The primary objective of the present invention is to provide a bicycle frame whose bearings will not be pressed.

Another objective of the present invention is to provide a bicycle frame, wherein the second threaded section of the mandrel has a threading direction different from that of the first threaded section of the mandrel, and each of the second locking nuts has a threading direction different from that of the respective first locking nut, so that when each of the first locking nuts is screwed onto the respective first threaded section of the mandrel and when each of the second locking nuts is screwed onto the respective second threaded section of the mandrel and rested on the respective fork end member, the respective fork end member will not be driven by the respective second locking nut to push the respective first locking nut to prevent the respective bearing from being compressed by the respective first locking nut so as to maintain the normal operation of the respective bearing.

A further objective of the present invention is to provide a bicycle frame, wherein each of the second locking nuts has a threading direction different from that of the respective first locking nut, so that when each of the second locking nuts is screwed onto the respective second threaded section of the mandrel, the mandrel will not be displaced by rotation of each of the second locking nuts to prevent the mandrel and the hub and freewheel assembly from being deviated from the original position and to keep the mandrel and the hub and freewheel assembly at the same central axis.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

DETAILED DESCRIPTION OF THE INVENTION

Figure 1:
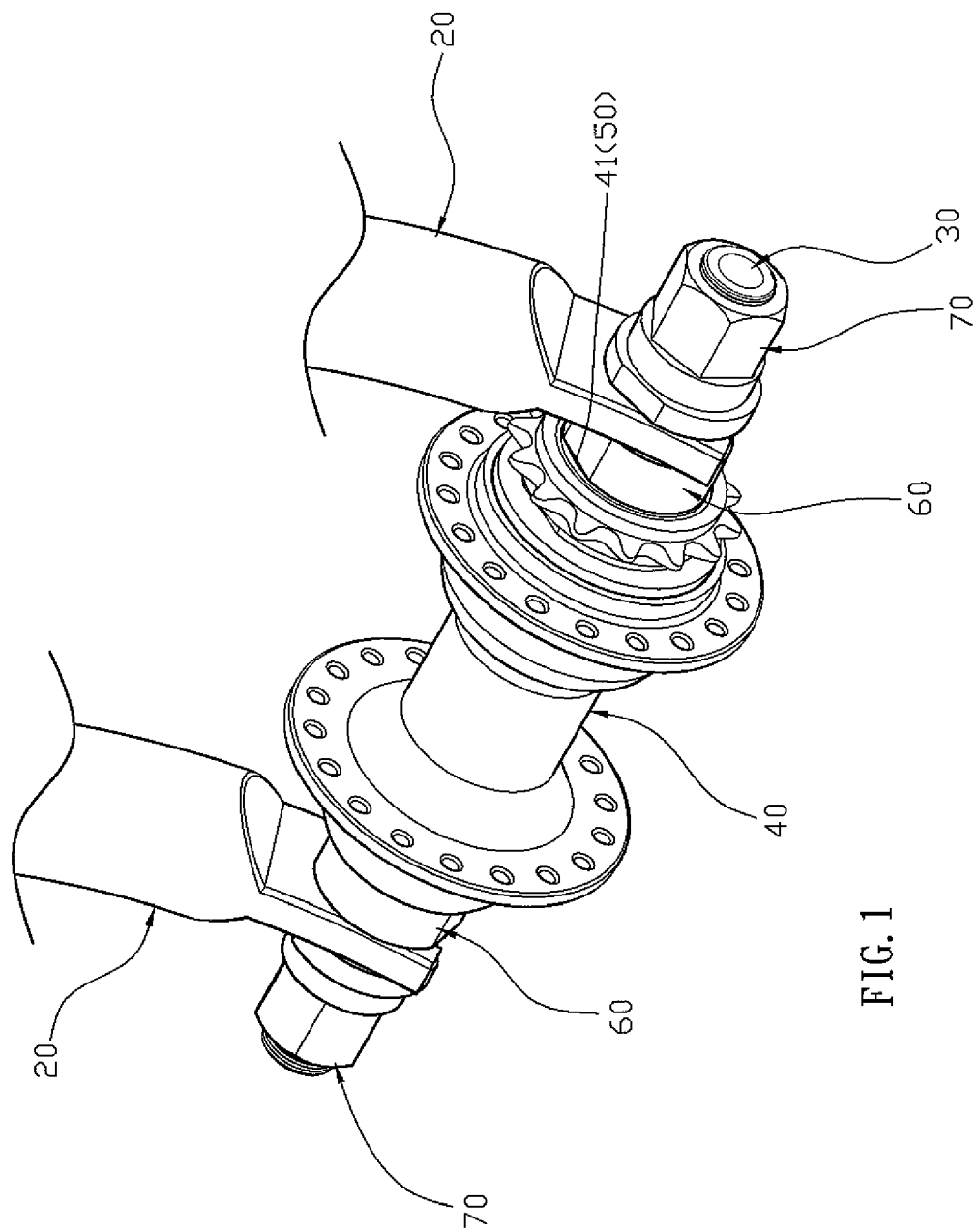
FIG. 1 is a perspective view of a bicycle frame in accordance with the preferred embodiment of the present invention.
Figure 2:
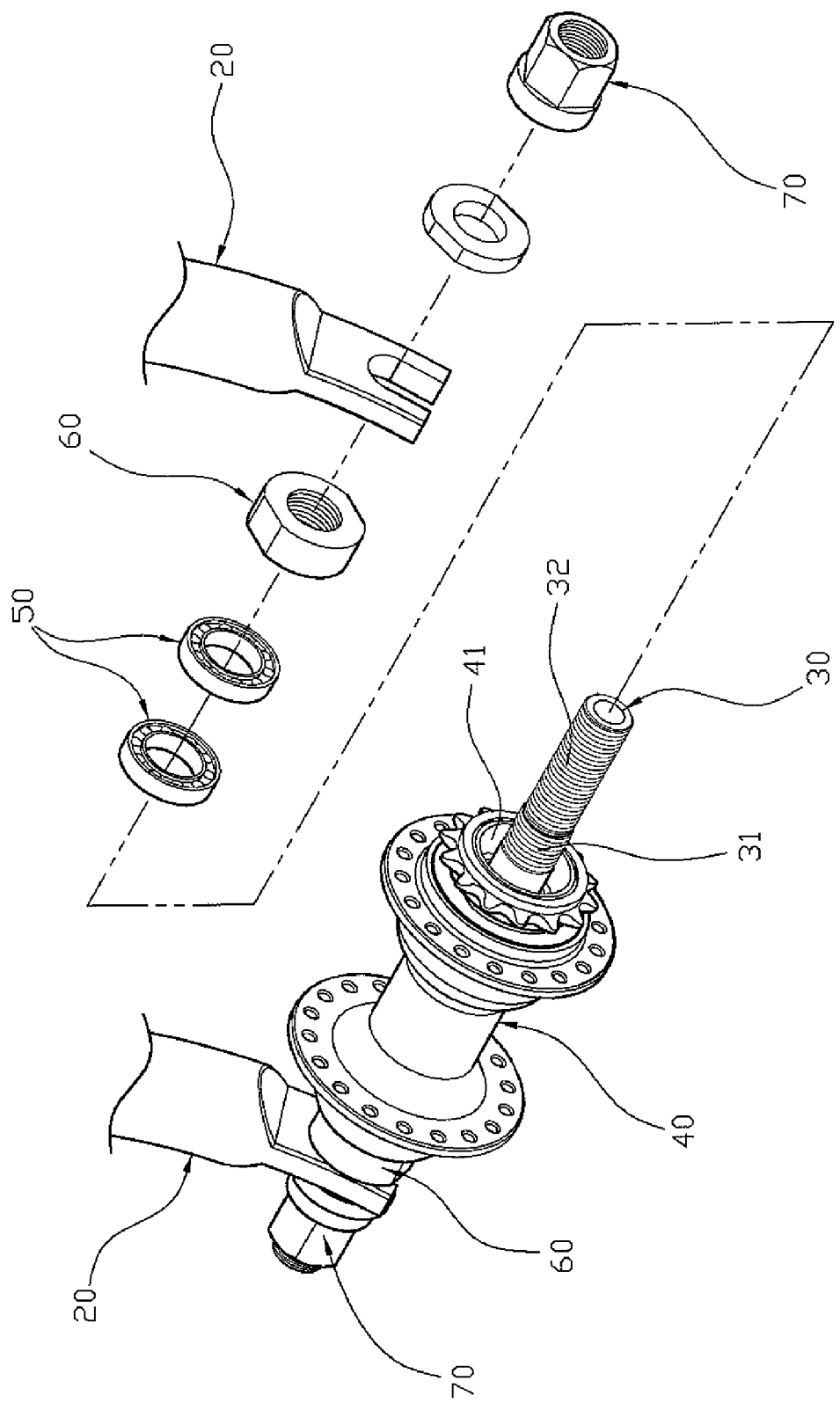
FIG. 2 is a partially exploded perspective view of the bicycle frame as shown in FIG. 1.
Figure 3:
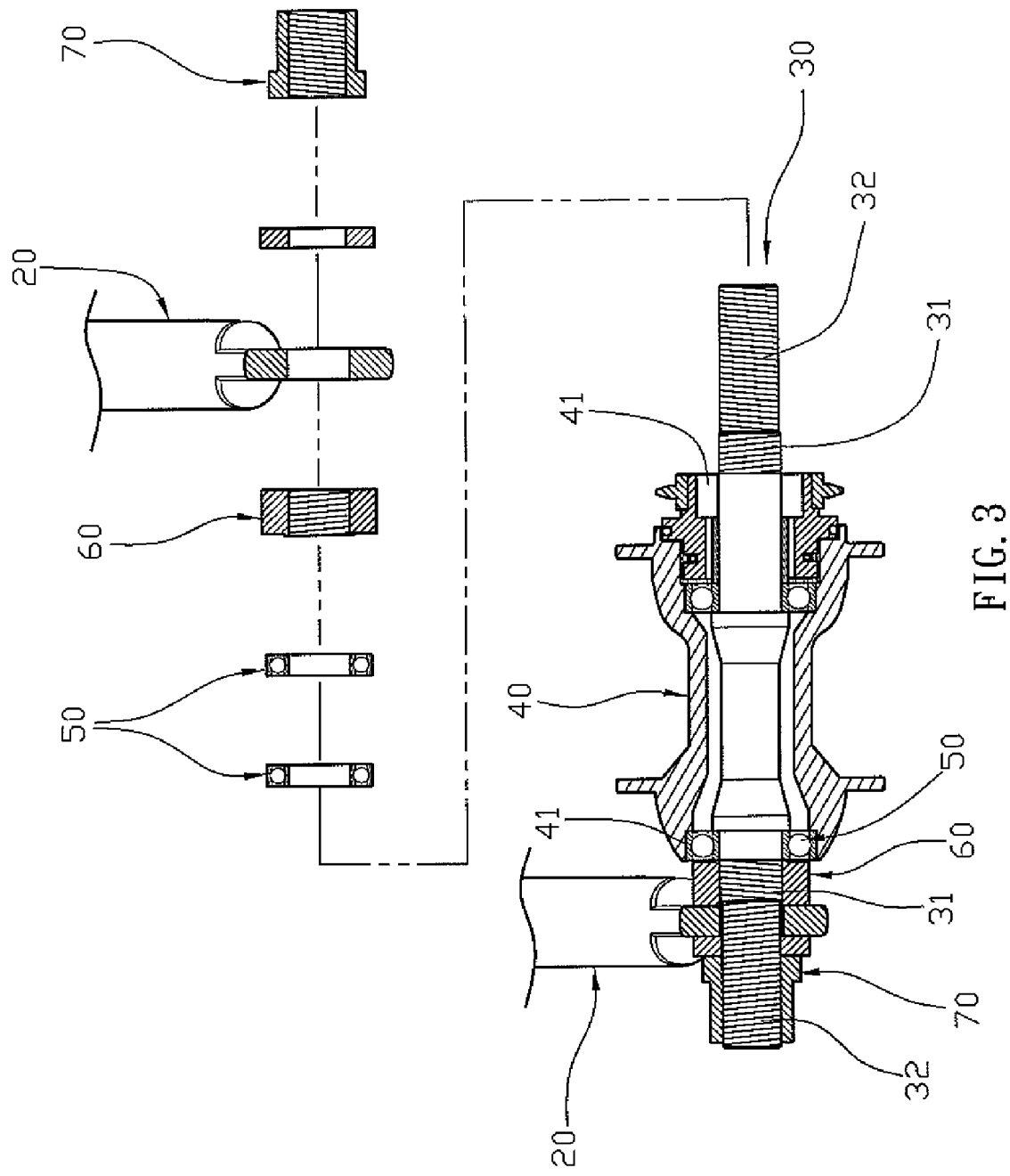
FIG. 3 is a front cross-sectional view of the bicycle frame as shown in FIG. 2.
Figure 4:
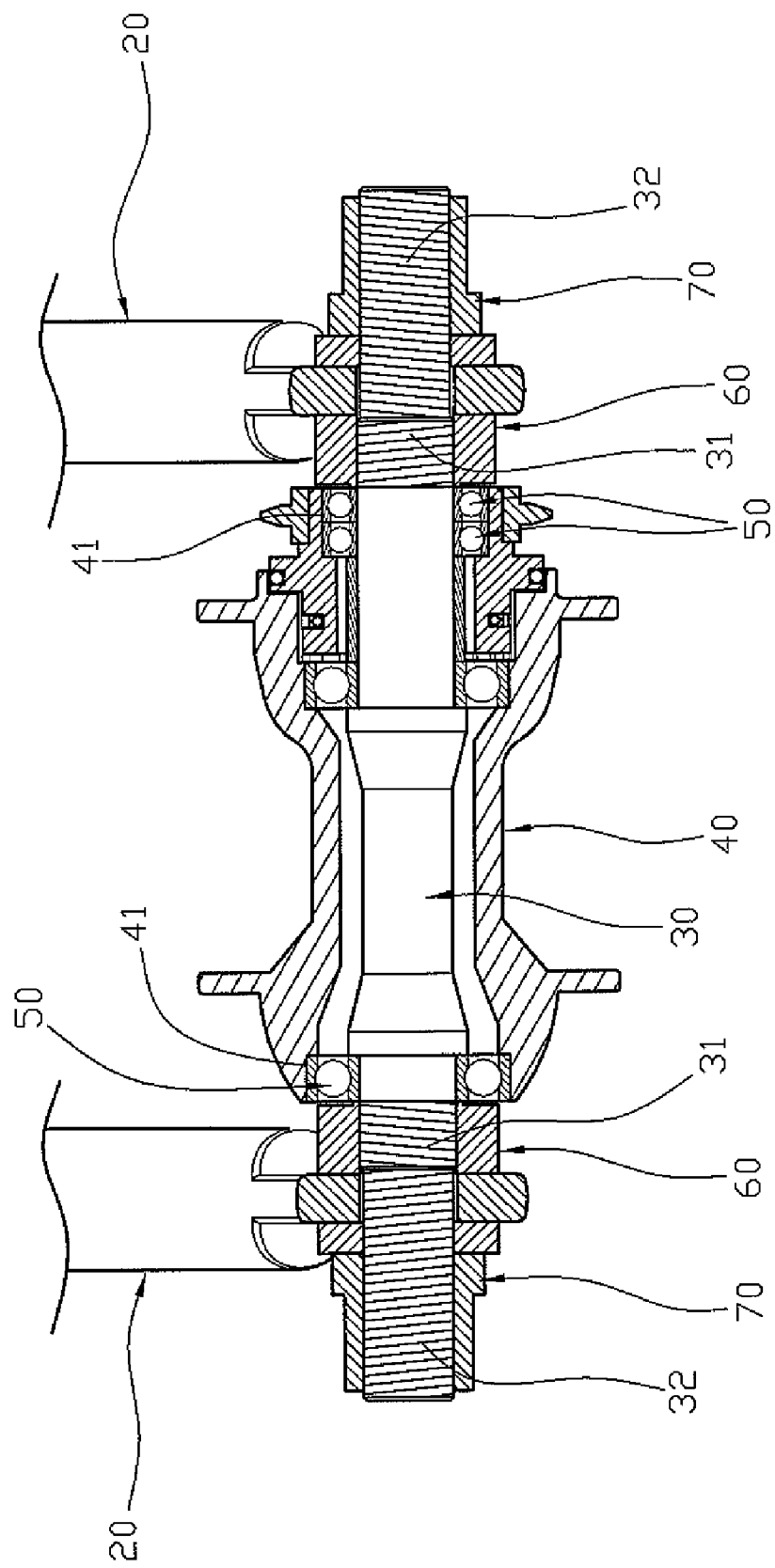
FIG. 4 is a front cross-sectional view of the bicycle frame as shown in FIG. 1.
Figure 5:
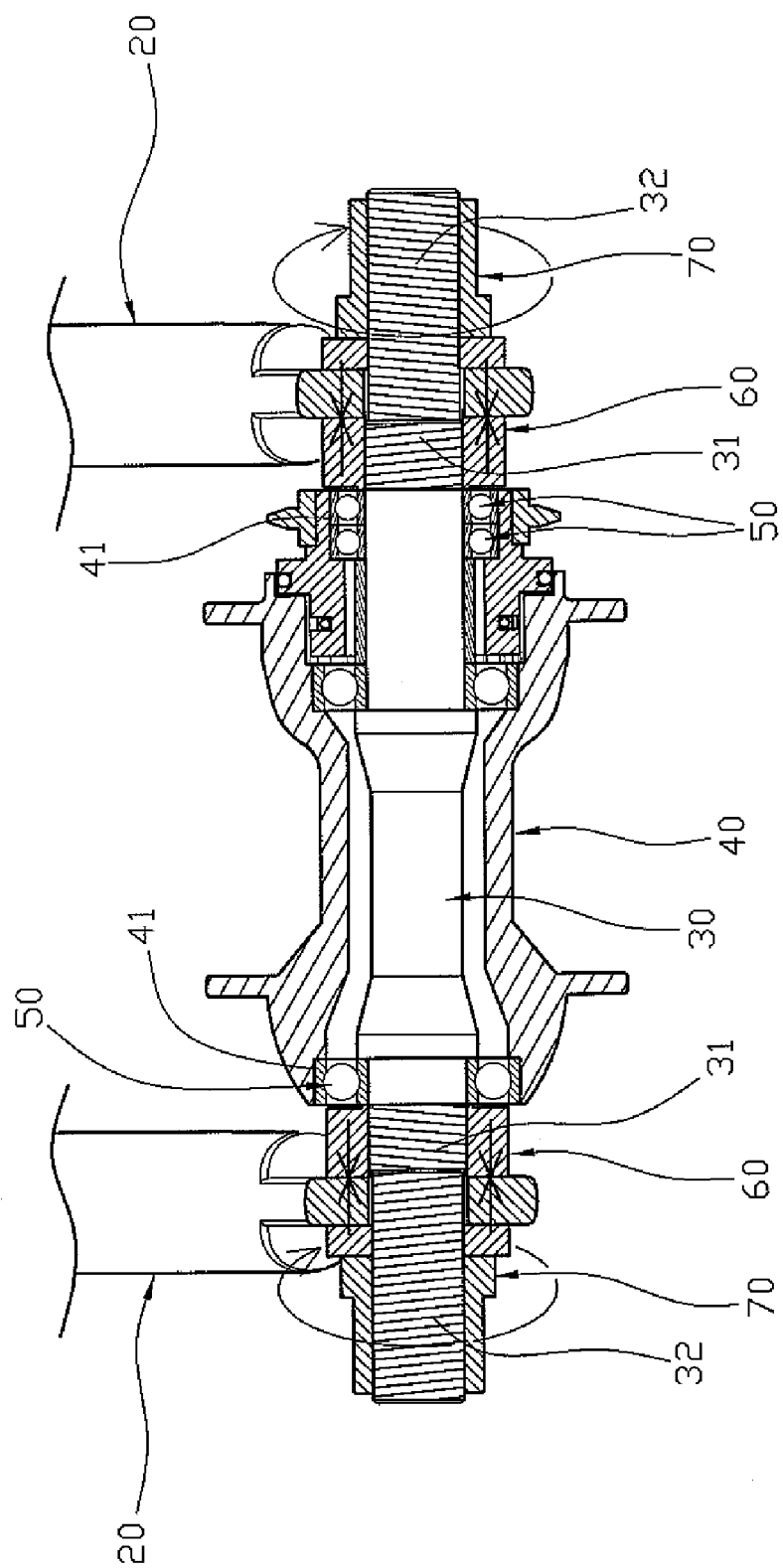
FIG. 5 is a schematic operational view of the bicycle frame as shown in FIG. 4.

Referring to the drawings and initially to FIGS. 1-5, a bicycle frame in accordance with the preferred embodiment of the present invention comprises a mandrel 30 having two opposite ends each having an inner side formed with a first threaded section 31 and an outer side formed with a second threaded section 32 having a threading direction different from that of the first threaded section 31, a hub and freewheel assembly 40 rotatably mounted on the mandrel 30 and having two opposite ends each formed with a bearing hole 41 to receive at least one bearing 50, two first locking nuts 60 each screwed onto the respective first threaded section 31 of the mandrel 30 and each rested on the respective bearing 50, two fork end members 20 each having a distal end mounted on the mandrel 30 and each rested on the respective first locking nut 60, and two second locking nuts 70 each screwed onto the respective second threaded section 32 of the mandrel 30 and each rested on the respective fork end member 20.

The fork end members 20 are connected to a front fork or a rear stay of the bicycle. Each of the fork end members 20 is mounted on the second threaded section 32 of the mandrel 30 and clamped between the respective first locking nut 60 and the respective second locking nut 70.

The first threaded section 31 and the second threaded section 32 of the two opposite ends of the mandrel 30 protrude outwardly from the hub and freewheel assembly 40. The first threaded section 31 of the mandrel 30 is located between the hub and freewheel assembly 40 and the second threaded section 32 of the mandrel 30. The first threaded section 31 of the mandrel 30 has a length smaller than that of the second threaded section 32 of the mandrel 30 and has a diameter greater than that of the second threaded section 32 of the mandrel 30.

The hub and freewheel assembly 40 is located between the first threaded sections 31 of the two opposite ends of the mandrel 30.

The bearing 50 is mounted on the mandrel 30 and located between the mandrel 30 and the hub and freewheel assembly 40 to reduce the friction between the mandrel 30 and the hub and freewheel assembly 40 so that the hub and freewheel assembly 40 is rotatable on the mandrel 30 smoothly. The bearing 50 is located beside the first threaded section 31 of the mandrel 30.

Each of the first locking nuts 60 has a threading direction corresponding to that of the respective first threaded section 31 of the mandrel 30. Each of the first locking nuts 60 has a first side rested on the respective bearing 50 and a second side rested on a first side of the respective fork end member 20. Each of the first locking nuts 60 has a length equal to that of the respective first threaded section 31 of the mandrel 30 to fully encompass the respective first threaded section 31 of the mandrel 30.

Each of the second locking nuts 70 has a threading direction different from that of the respective first locking nut 60 and corresponding to that of the respective second threaded section 32 of the mandrel 30. Each of the second locking nuts 70 has a side rested on a second side of the respective fork end member 20.

Accordingly, the second threaded section 32 of the mandrel 30 has a threading direction different from that of the first threaded section 31 of the mandrel 30, and each of the second locking nuts 70 has a threading direction different from that of the respective first locking nut 60, so that when each of the first locking nuts 60 is screwed onto the respective first threaded section 31 of the mandrel 30 and when each of the second locking nuts 70 is screwed onto the respective second threaded section 32 of the mandrel 30 and rested on the respective fork end member 20, the respective fork end member 20 will not be driven by the respective second locking nut 70 to push the respective first locking nut 60 to prevent the respective bearing 50 from being compressed by the respective first locking nut 60 so as to maintain the normal operation of the respective bearing 50. In addition, each of the second locking nuts 70 has a threading direction different from that of the respective first locking nut 60, so that when each of the second locking nuts 70 is screwed onto the respective second threaded section 32 of the mandrel 30, the mandrel 30 will not be displaced by rotation of each of the second locking nuts 70 to prevent the mandrel 30 and the hub and freewheel assembly 40 from being deviated from the original position and to keep the mandrel 30 and the hub and freewheel assembly 40 at the same central axis.

Figure 6:
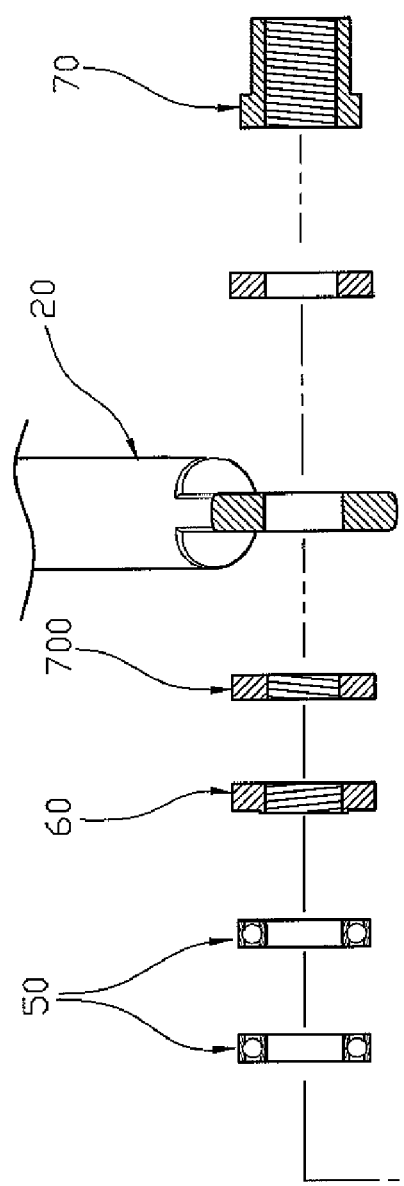
FIG. 6 is a front exploded cross-sectional view of a bicycle frame in accordance with another preferred embodiment of the present invention.
Figure 6:
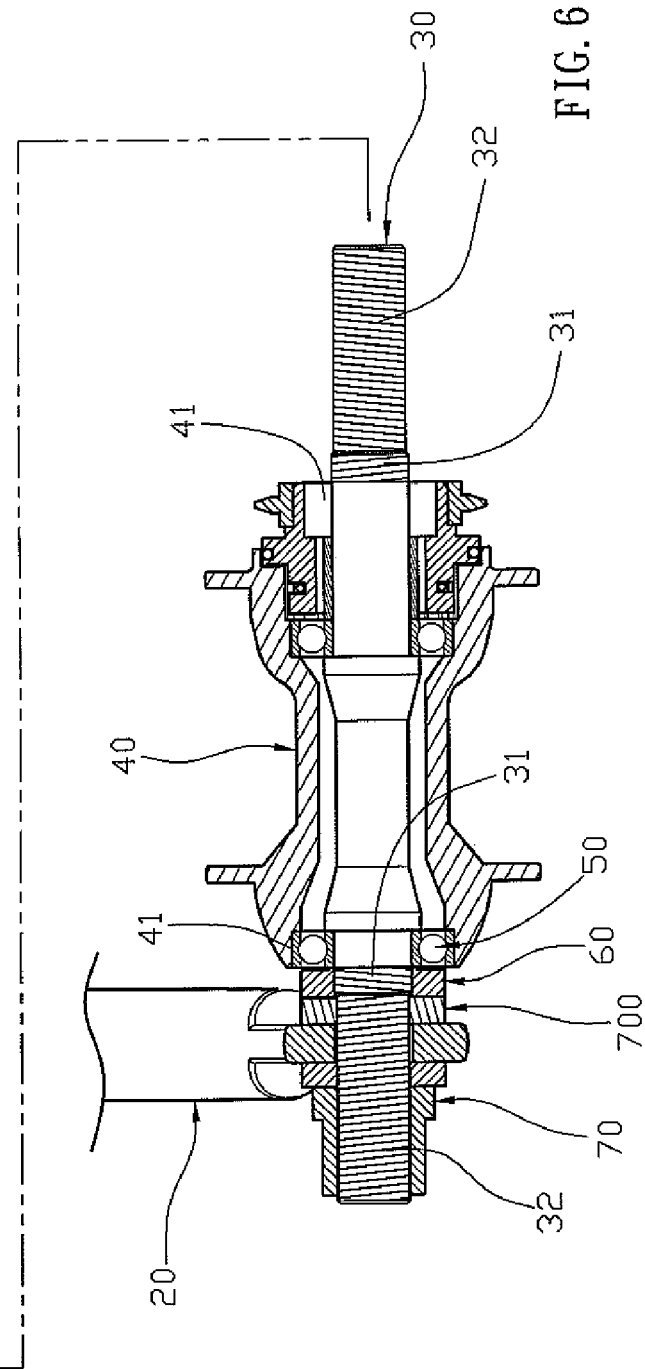
Figure 7:
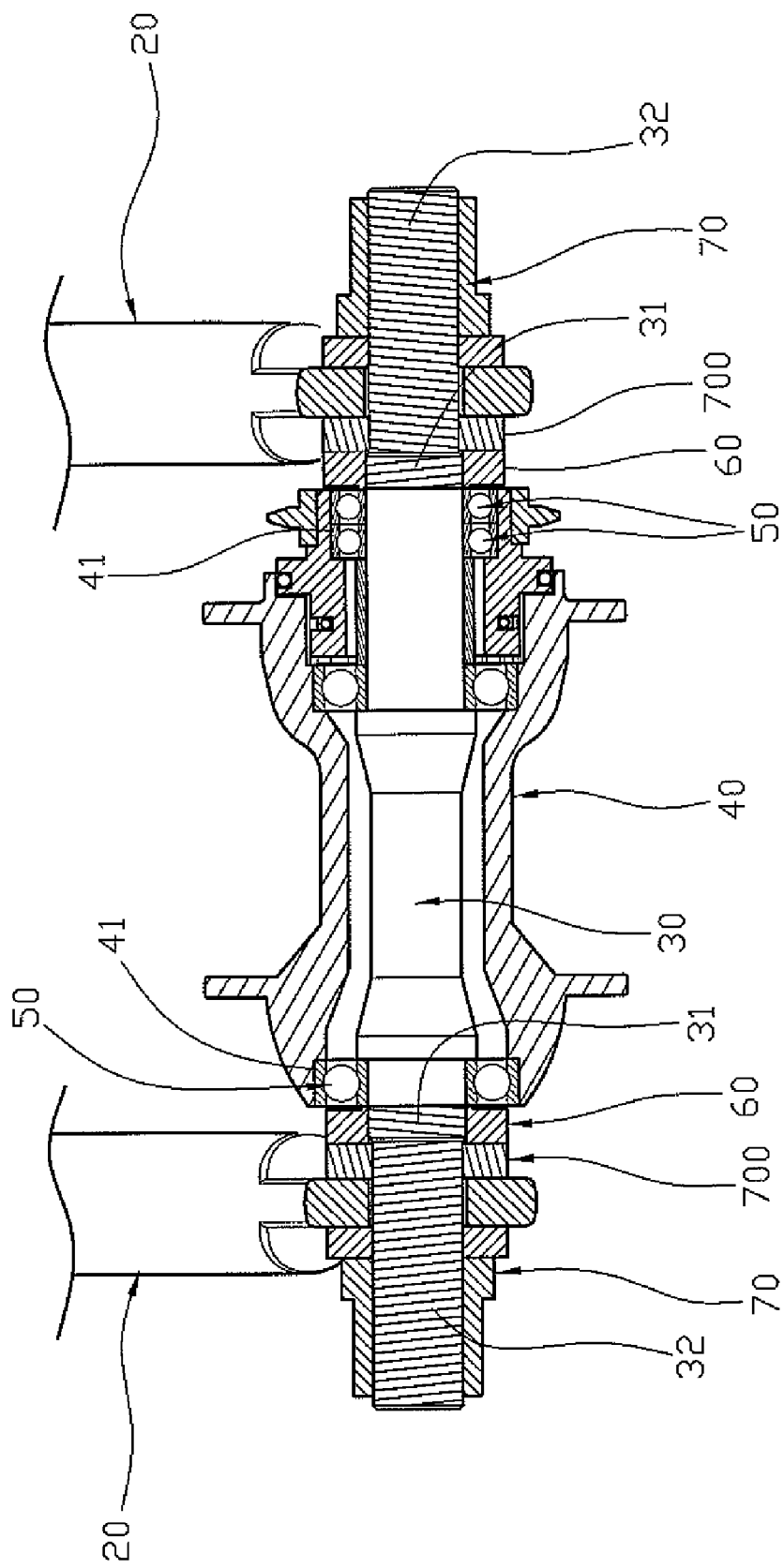
FIG. 7 is a cross-sectional assembly view of the bicycle frame as shown in FIG. 6.
Figure 8:
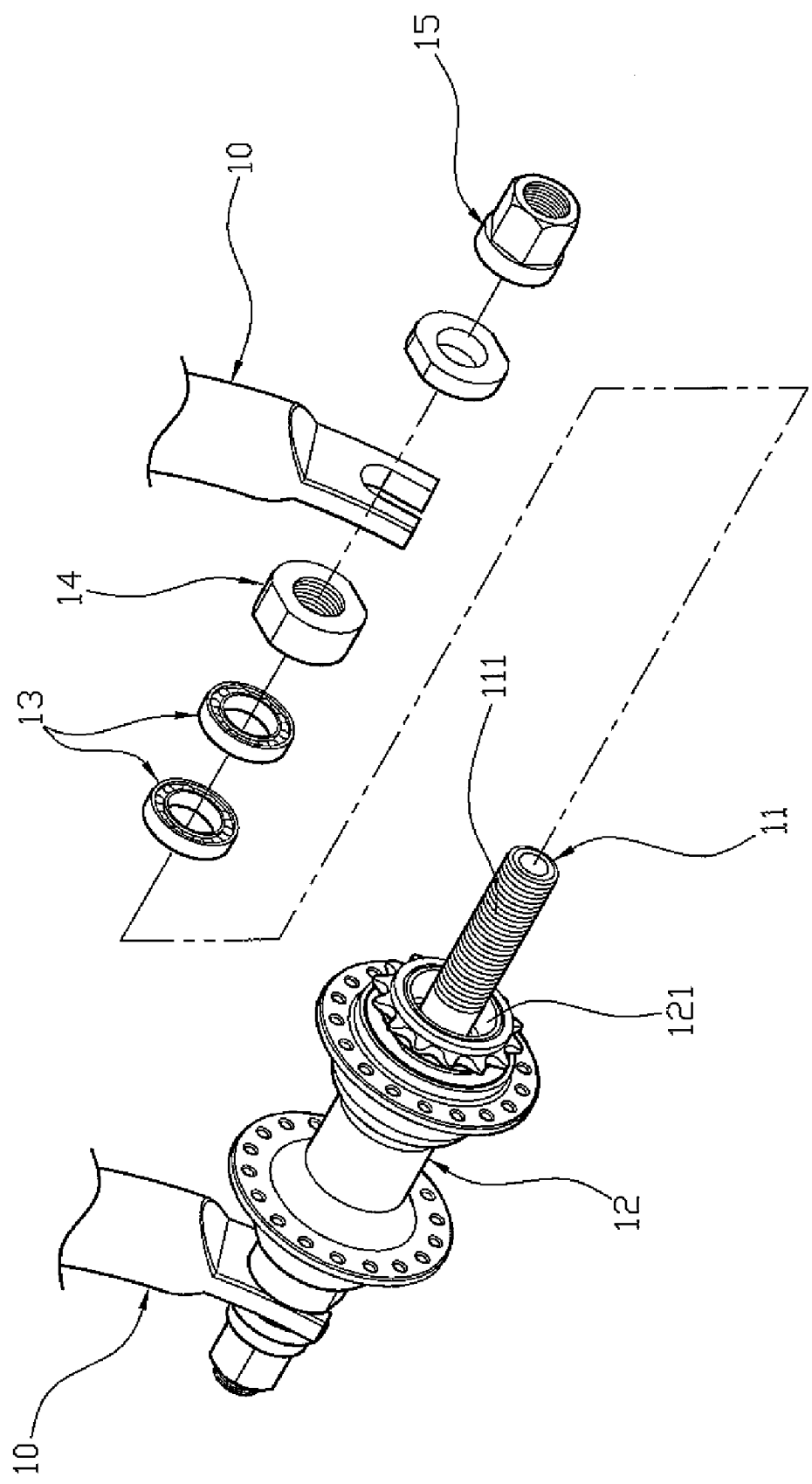
FIG. 8 is an exploded perspective view of a conventional bicycle frame in accordance with the prior art.
Figure 9:
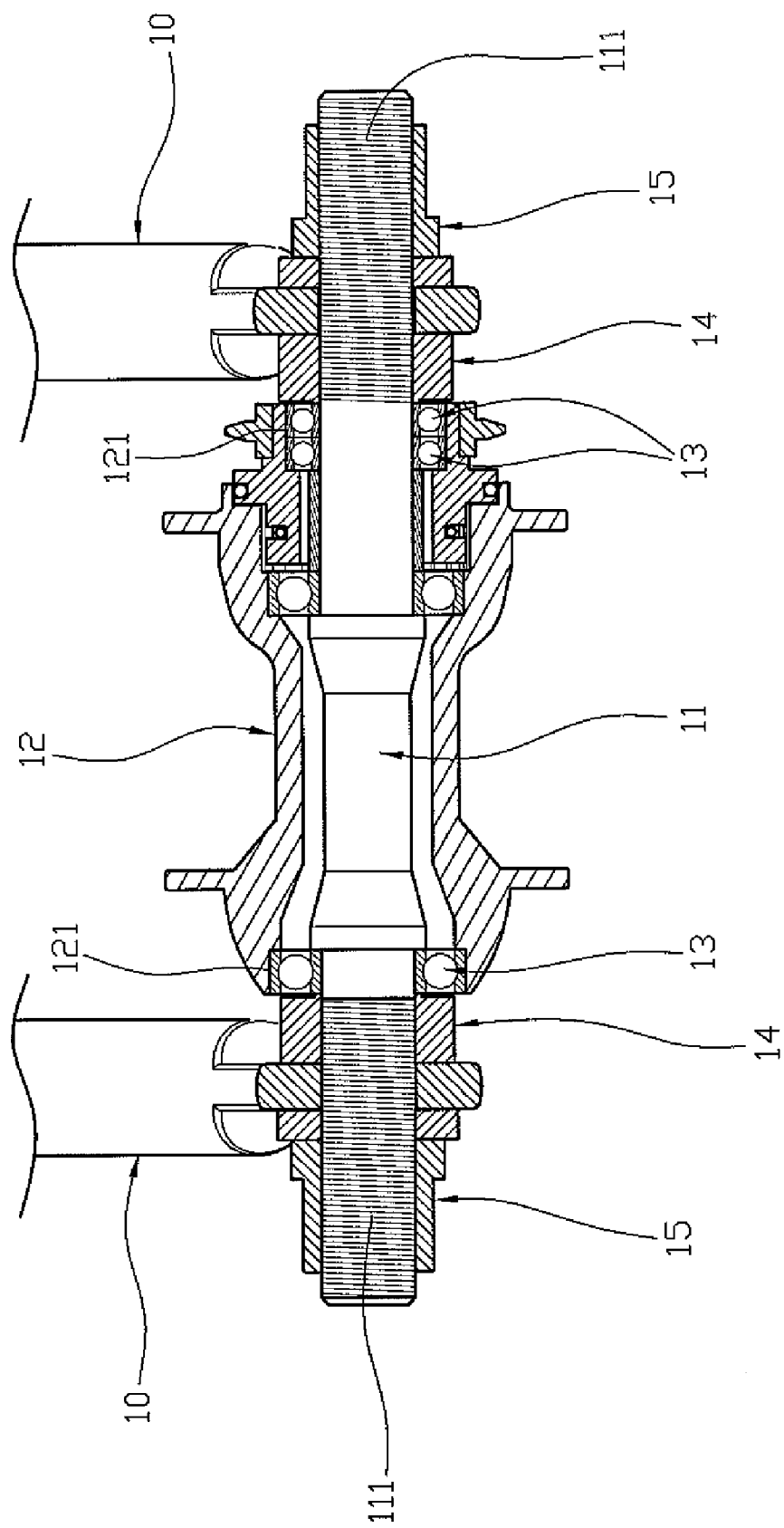
FIG. 9 is a front cross-sectional assembly view of the conventional bicycle frame as shown in FIG. 8.
Figure 10:
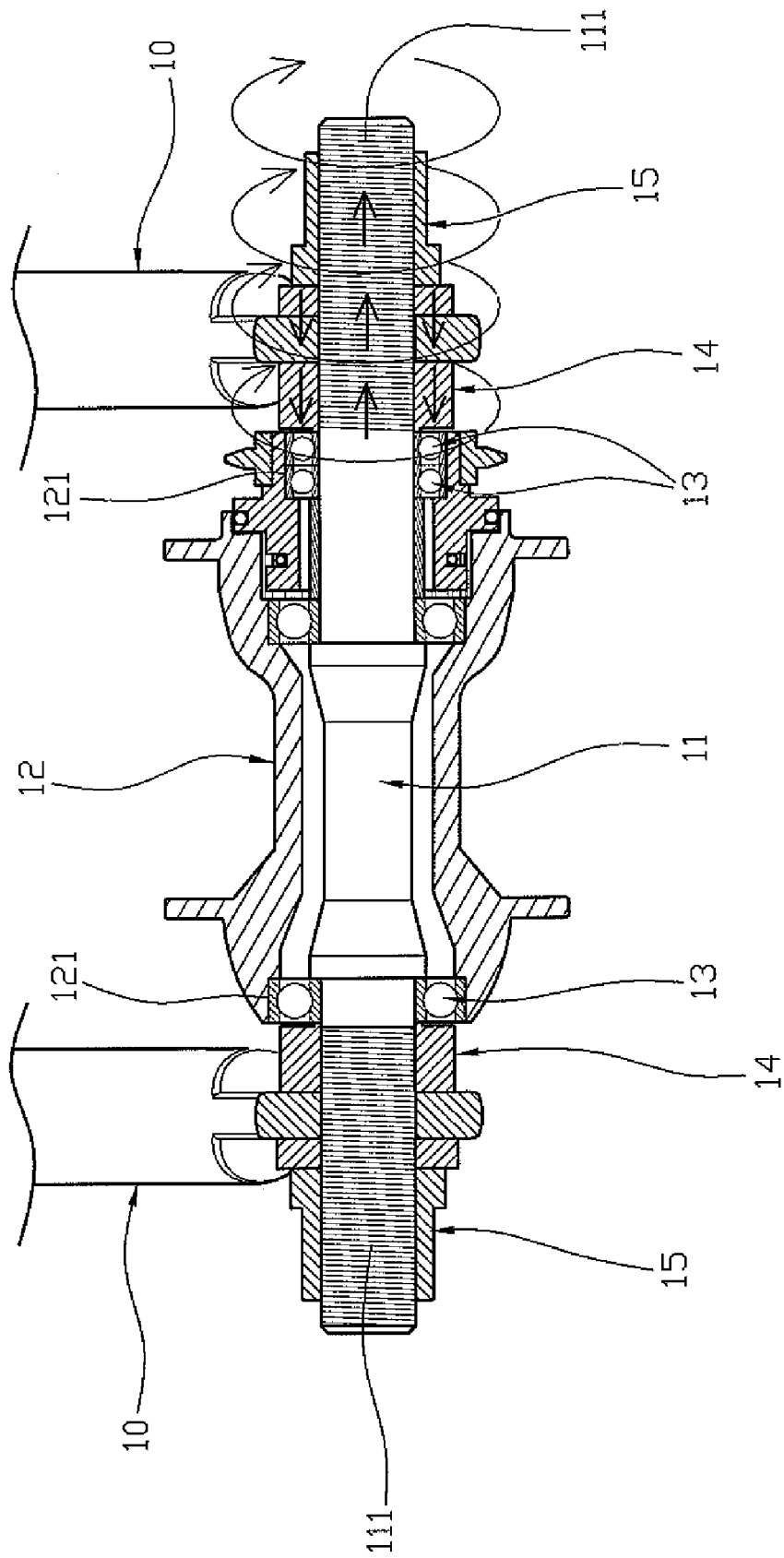
FIG. 10 is a schematic operational view of the conventional bicycle frame as shown in FIG. 9.

Referring to FIGS. 6 and 7, the bicycle frame further comprises two third locking nuts 700 each screwed onto the respective second threaded section 32 of the mandrel 30 and each located between the respective first locking nut 60 and the respective fork end member 20 to enhance the locking effect of the bicycle frame. Each of the third locking nuts 700 has a threading direction different from that of the respective first locking nut 60, the same as that of the respective second locking nut 70, and corresponding to that of the respective second threaded section 32 of the mandrel 30.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

The invention claimed is:

1. A bicycle frame, comprising:
a mandrel having two opposite ends each having an inner side formed with a first threaded section and an outer side formed with a second threaded section having a threading direction different from that of the first threaded section;
a hub and freewheel assembly rotatably mounted on the mandrel and having two opposite ends each formed with a bearing hole to receive at least one bearing;
two first locking nuts each screwed onto the respective first threaded section of the mandrel and each rested on and contacting with the respective bearing;
two fork end members each having a distal end mounted on the mandrel and each rested on the respective first locking nut;
two second locking nuts each screwed onto the respective second threaded section of the mandrel and each rested on and contacting with the respective fork end member;
wherein the first threaded section of the mandrel is located between the hub and freewheel assembly and the second threaded section of the mandrel;
each of the fork end members is mounted on the second threaded section of the mandrel.

2. The bicycle frame in accordance with claim 1, wherein each of the fork end members is clamped between the respective first locking nut and the respective second locking nut and has a first side pressed by the respective first locking nut and a second side pressed by the respective second locking nut.

3. The bicycle frame in accordance with claim 1, wherein the first threaded section and the second threaded section of the two opposite ends of the mandrel protrude outwardly from the hub and freewheel assembly.

4. The bicycle frame in accordance with claim 1, wherein the first threaded section of the mandrel has a length smaller than that of the second threaded section of the mandrel and is fully hidden in the respective first locking nut.

5. The bicycle frame in accordance with claim 1, wherein the first threaded section of the mandrel has a diameter greater than that of the second threaded section of the mandrel.

6. The bicycle frame in accordance with claim 1, wherein the hub and freewheel assembly is located between the first threaded sections of the two opposite ends of the mandrel.

7. The bicycle frame in accordance with claim 1, wherein the bearing is located beside the respective first threaded section of the mandrel and pressed by the respective first locking nut.

8. The bicycle frame in accordance with claim 1, wherein each of the first locking nuts has a threading direction corresponding to that of the respective first threaded section of the mandrel.

9. The bicycle frame in accordance with claim 1, wherein each of the first locking nuts has a first side rested on and contacting with the respective bearing and a second side rested on and pressing a first side of the respective fork end member.

10. The bicycle frame in accordance with claim 9, wherein each of the second locking nuts has a side rested on and pressing a second side of the respective fork end member.

11. The bicycle frame in accordance with claim 1, wherein each of the first locking nuts has a length equal to that of the respective first threaded section of the mandrel to fully encompass the respective first threaded section of the mandrel.

12. The bicycle frame in accordance with claim 1, wherein each of the second locking nuts has a threading direction different from that of the respective first locking nut.

13. The bicycle frame in accordance with claim 1, wherein each of the second locking nuts has a threading direction corresponding to that of the respective second threaded section of the mandrel.

14. The bicycle frame in accordance with claim 1, further comprising two third locking nuts each screwed onto the respective second threaded section of the mandrel and each located between and pressed by the respective first locking nut and the respective fork end member.

15. The bicycle frame in accordance with claim 14, wherein each of the third locking nuts has a threading direction different from that of the respective first locking nut.

16. The bicycle frame in accordance with claim 14, wherein each of the third locking nuts has a threading direction the same as that of the respective second locking nut.

17. The bicycle frame in accordance with claim 14, wherein each of the third locking nuts has a threading direction corresponding to that of the respective second threaded section of the mandrel.

18. The bicycle frame in accordance with claim 1, wherein the bearing is mounted on the mandrel and located between the mandrel and the hub and freewheel assembly.

* * * * *